(12) United States Patent
Fortenbery et al.

(10) Patent No.: US 6,715,599 B1
(45) Date of Patent: Apr. 6, 2004

(54) CONVEYOR SYSTEM HAVING AN IMPROVED CHUTE

(75) Inventors: J. David Fortenbery, Charlotte, NC (US); David Patrick Erceg, Concord, NC (US); Robert Charles Stevens, Charlotte, NC (US); Robert Harold Lavin, Cornelius, NC (US)

(73) Assignee: Mantissa Corporation, Charlotte, NC (US)

( * ) Notice: Subject to any disclaimer, the term of this patent is extended or adjusted under 35 U.S.C. 154(b) by 0 days.

(21) Appl. No.: 10/180,915

(22) Filed: Jun. 26, 2002

(51) Int. Cl.$^7$ ............................................. B65G 47/10
(52) U.S. Cl. .................. 198/360; 198/370.03; 198/435
(58) Field of Search ............... 198/360, 370.03–370.05, 198/435; 193/24, 29

(56) References Cited

U.S. PATENT DOCUMENTS

| | | | |
|---|---|---|---|
| 4,744,454 A | 5/1988 | Polling | 198/365 |
| 5,054,601 A | 10/1991 | Sjogren et al. | 198/365 |
| 5,086,905 A | 2/1992 | Polling | 198/365 |
| 6,050,390 A * | 4/2000 | Fortenbery et al. | 198/370.03 |
| 6,095,314 A * | 8/2000 | Fortenbery | 198/360 |
| 6,227,377 B1 * | 5/2001 | Bonnet | 198/435 |
| 6,499,582 B1 | 12/2002 | Gillott | 198/360 |

FOREIGN PATENT DOCUMENTS

WO  WO 90/09944  9/1990

* cited by examiner

*Primary Examiner*—Joseph E. Valenza
(74) *Attorney, Agent, or Firm*—MacCord Mason PLLC (57) ABSTRACT

A package sorting conveyor system. The conveyor system includes: a conveying track; at least one unloading station; and a transition zone funnel upstream of the unloading station to receive the package from the conveying track, the transition zone funnel including a positioner assembly for selectively positioning the outlet of the transition zone funnel between at least a first and a second position. Also, in the preferred embodiment, the present invention includes a secondary downstream chute located downstream from the transition zone funnel for conveying the discharged package to its final destination.

52 Claims, 12 Drawing Sheets

CONVEYOR SYSTEM HAVING AN IMPROVED CHUTE

BACKGROUND OF THE INVENTION (1) Field of the Invention

The present invention relates generally to package sorting conveyors and, more particularly, to a conveyor system having a conveying track, a transition zone funnel for receiving a package from the conveying track, selectively positionable between at least a first and second position, and a secondary chute downstream from the transition zone funnel having at least two definable discharge paths.

(2) Description of the Prior Art

Conveyor systems having a number of individual carrying carts have been used for many years to carry and sort packages such as shoes and apparel or other items such as mail. Conventional tilt tray sorters discharge their goods onto individual chutes located near each packer. For example, U.S. Pat. No. 5,054,601 to Sjogren et al. discloses a package sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are out-feed positions for receiving packages from the carriers. When a particular carrier holding a particular package to be sorted reaches a selected out-feed position, an actuator tilts the tray to dump the package into a transition zone funnel or other package-receiving device.

Another example of a similar package sorting conveyor is disclosed in International PCT Application No. PCT/DK90/00047 of Kosan Crisplant A/S.

One significant disadvantage of most conventionally designed package sorting conveyors is that the conveyor carriers laterally tilts only on a horizontal axis parallel to the direction of conveyor travel. While this accomplishes the objective of dumping the package from the carrier at the out-feed position, the package is often roughly tumbled or rolled, sometimes damaging the package and package's contents. One reason for this is that the package typically is unloaded from the carrier while still traveling forward at the same speed as the conveyor. Thus, packages tend to slam into a forward retaining wall of the transition zone funnel or other package-receiving device.

Another problem with most conventional horizontally tilting conveyors is that because the package is moving forward at full speed when they are unloaded at the out-feed position, the transition zone funnel must be relatively wide so that the package does not miss the funnel and fall off the conveyor past the funnel. This often unnecessarily decreases the number and location of the out-feed positions of the conveyor system.

U.S. Pat. Nos. 4,744,454 and 5,086,905, both to Pölling, disclose previous attempts to remedy this problem of rough handling by conventional laterally tilting conveyor carriers. Both of these patents to Polling disclose a conveyor element for a package conveyor that includes a tilting carrier tray mounted to be rotatable about two swivel axis. A first swivel shaft extends obliquely downward from the under side of the carrying tray and is in turn connected at an angle to the end of a second swivel shaft extending obliquely upwards from a base support part of the conveyor element. Together, the two swivel shafts form a "V" that points in the direction of the conveyor travel. Both of the swivel shafts lie in the vertical plain of symmetry of the conveyor element when the carrier tray is disposed in its upright position.

Because the carrier tray of Polling rotates about two oblique axis, the carrier tray tilts not only on a horizontal axis, but is moved through a geometrically complex spatial reorientation during package discharge. This allows for more gentle placement of a package on an out-feed chute than can be accomplished using conventional conveyor trays that laterally tip only on a horizontal axis because the Polling conveyor element imparts some degree of rearward velocity to the package as it is discharged, which, when added to the forward velocity of the conveyor system, results in the package's forward velocity during discharge being lessened.

However, the conveyor elements of both of Pölling's patents are unduly complicated. In fact, the second Pölling patent was directed towards simplifying the original design disclosed in the first Pölling patent which was expensive and complicated to manufacture efficiently. As a result of this complexity and cost, the Pölling devices have not enjoyed significant commercial acceptance and success. In addition, there is no provision in Pölling to take advantage of the tilting movement of the tray to allow the direction of the discharged package to be further controlled.

Another significant disadvantages of conventionally designed package sorting conveyors is the lack of versatility and amount of floor space required by the conveyor, especially when sorting a variety of items on the same conveyor is desired. For example, it is common in distribution centers to sort items both contained in cardboard boxes, such as shoes, and in polyurethane bags, such as shirts.

Conventional sorting conveyors sort boxes and bags by providing package-receiving devices at out-feed positions that have a roller-lined surfaces for boxes, and more steeply declined package-receiving devices at different out-feed positions without rollers for bags. Thus a fixed number of box out-feed positions and bag out-feed positions are established on the conveyor. Alternatively, distribution centers may use two conventional sorting conveyors, one dedicated to boxes and one to bags.

It is often the case, however, that when sales product mixes change, a distribution center sorting both boxes and bags is required to sort either fewer boxes and more bags, or vice versa. In such cases, a distribution center using a sorting conveyor with a fixed number of out-feed positions for boxes and bags must make costly modifications to a conventionally designed sorting conveyor. In the alternative, the center may have designed excess out-feed positions for both boxes and bags into the conventional sorting conveyor in anticipation of product mix changes, which increases the size of the conventionally designed sorting conveyor. So the distribution center must choose between such competing alternatives.

Thus, there remains a need for a new and improved package sorting conveyor system having a conveying track and a transition zone funnel for receiving a package from the conveying track which is selectively positionable between at least a first and second position while, at the same time, includes a secondary chute downstream from the transition zone funnel having at least two definable discharge paths.

SUMMARY OF THE INVENTION

The present invention is directed to a package sorting conveyor system including: a conveying track; at least one unloading station; and a transition zone funnel upstream of the unloading station to receive the package from the conveying track, the transition zone funnel including a positioner assembly for selectively positioning the outlet of the transition zone funnel between at least a first and a second position. Also, in the preferred embodiment, the present invention includes a secondary downstream chute located downstream from the transition zone funnel for conveying the discharged package to its final destination.

In the preferred embodiment, the transition zone funnel includes: (i) an inlet adjacent to the conveying track at the unloading station for receiving the package; (ii) an upwardly inclined downstream wall located downstream of the inlet for preventing the package from tipping over; (iii) an outlet located downstream from the upwardly inclined downstream wall for discharging the package from the funnel; and (iv) a positioner assembly for selectively positioning the outlet of the transition zone funnel between at least a first and a second position along at least two axis.

Also, in the preferred embodiment, the inlet of the transition zone funnel is substantially flat to receive the package being discharged by the package sorting conveyor system. Also, the inlet may be wider than the front edge of the package providing a wider range of curvature enabling the package to slide off the package sorting conveyor system onto the inlet. The upwardly inclined downstream wall preferably has a radius of curvature of between about 6 inches and 2½ feet, with about 1 foot being most preferred. Thus, the forward direction of the package may change about 90° from its initial direction on the conveying track to its direction at the outlet of the funnel. In the preferred embodiment, the surface of the transition zone funnel is a low-friction, wear-resistant polymeric material, such as high-density polyethylene. The positioner assembly for selectively positioning between at least a first and a second position along at least two axis may further include at least one pivot point and a drive means. The pivot point may be a ball joint, an inclined axis or at least two independent pivots. In the preferred embodiment, the two independent pivots include a rotary joint and a hinge joint. The drive means for positioning may include a rotary actuator and a linear actuator. In the preferred embodiment, the linear actuator is a fluid actuator, such as a pneumatic air cylinder.

The transition zone funnel may further include a powered conveying section for accelerating or decelerating the package. The powered conveying section may be a powered roller or a powered belt.

The secondary chute may further include at least two definable discharge paths. In the preferred embodiment, at least one of the discharge path includes at least one path having a curved surface. In the preferred embodiment, the curved surface is between about 90° and 360°. Also, in the preferred embodiment, the curved surface is between about 6 inches and 30 inches radius of curvature. The surface of the secondary downstream chute may be a low friction, wear resistant polymeric material. In the preferred embodiment, the material is a high density polyethylene.

Accordingly, one aspect of the present invention is to provide a package sorting conveyor system including: a conveying track; at least one unloading station; and a transition zone funnel upstream of the unloading station to receive the package, the transition zone funnel including a positioner assembly for selectively positioning the outlet of the transition zone funnel between at least a first and a second position.

Another aspect of the present invention is to provide a transition zone funnel for receiving a package discharged at an unloading station by a package sorting conveyor system having a conveying track, the transition zone funnel including: an inlet adjacent to the conveying track at the unloading station for receiving the package; an upwardly inclined downstream wall located downstream of the inlet for preventing the package from tipping over; an outlet located downstream from the upwardly inclined downstream wall for discharging the package from the funnel; and a positioner assembly for selectively positioning the outlet of the transition zone funnel between at least a first and a second position along at least two axis.

Still another aspect of the present invention is to provide a package sorting conveyor system including: a conveying track; at least one unloading station; a transition zone funnel upstream of the unloading station to receive the package from the conveying track, the transition zone funnel including: (i) an inlet adjacent to the conveying track at the unloading station for receiving the package; (ii) an upwardly inclined downstream wall located downstream of the inlet for preventing the package from tipping over; (iii) an outlet located downstream from the upwardly inclined downstream wall for discharging the package from the funnel; and (iv) a positioner assembly for selectively positioning the outlet of the transition zone funnel between at least a first and a second position along at least two axis; and a secondary downstream chute located downstream from the transition zone funnel for conveying the discharged package to its final destination.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
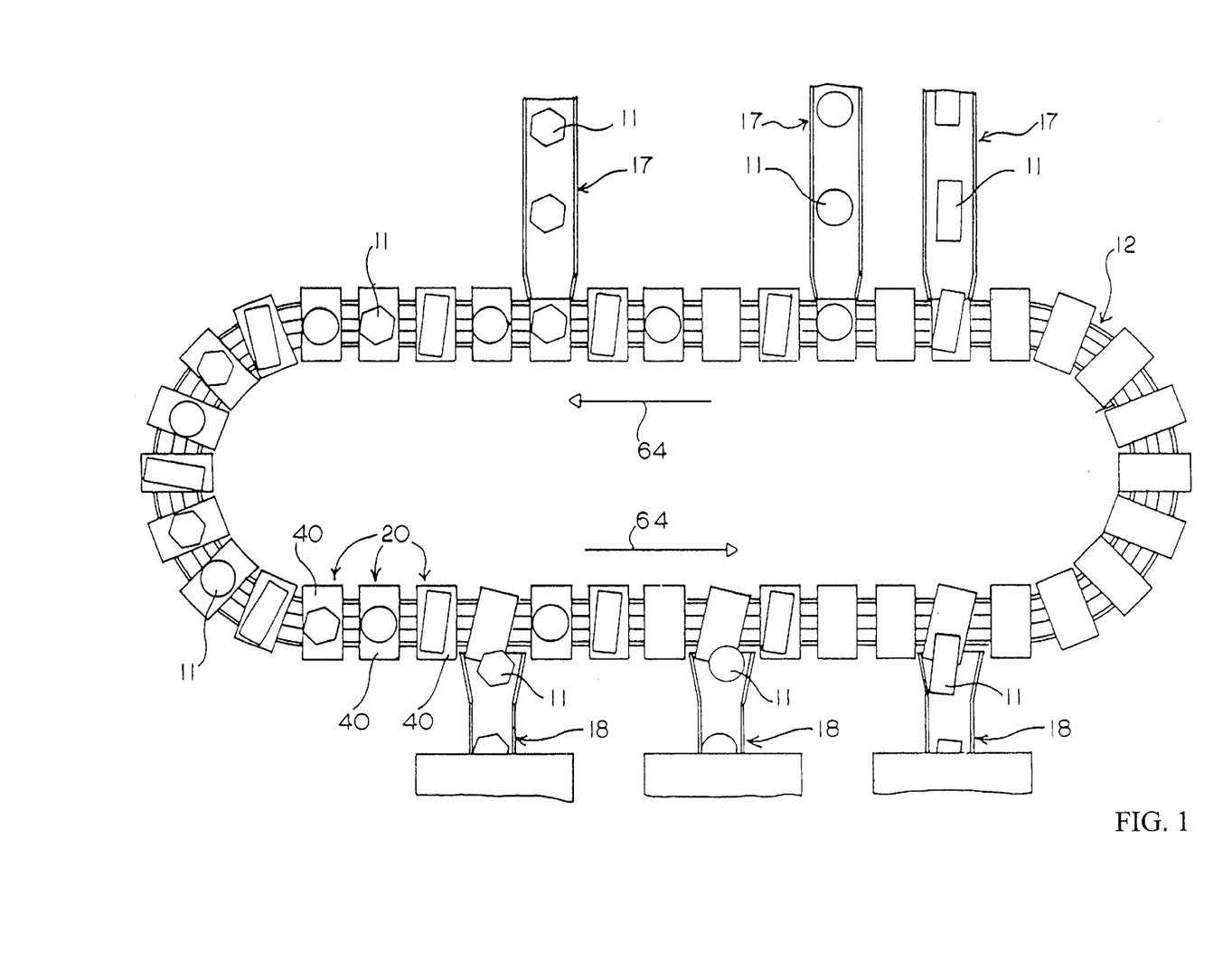
FIG. 1 is a schematic diagram illustrating a package sorting conveyor constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a sorting conveyor, generally designated 10, is shown constructed according to the present invention for transporting and sorting a package 11 or other object. The sorting conveyor 10 includes a train of individual carts 20, connected end to end, which preferably form an endless loop around a closed conveyor track 12.

Figure 2:
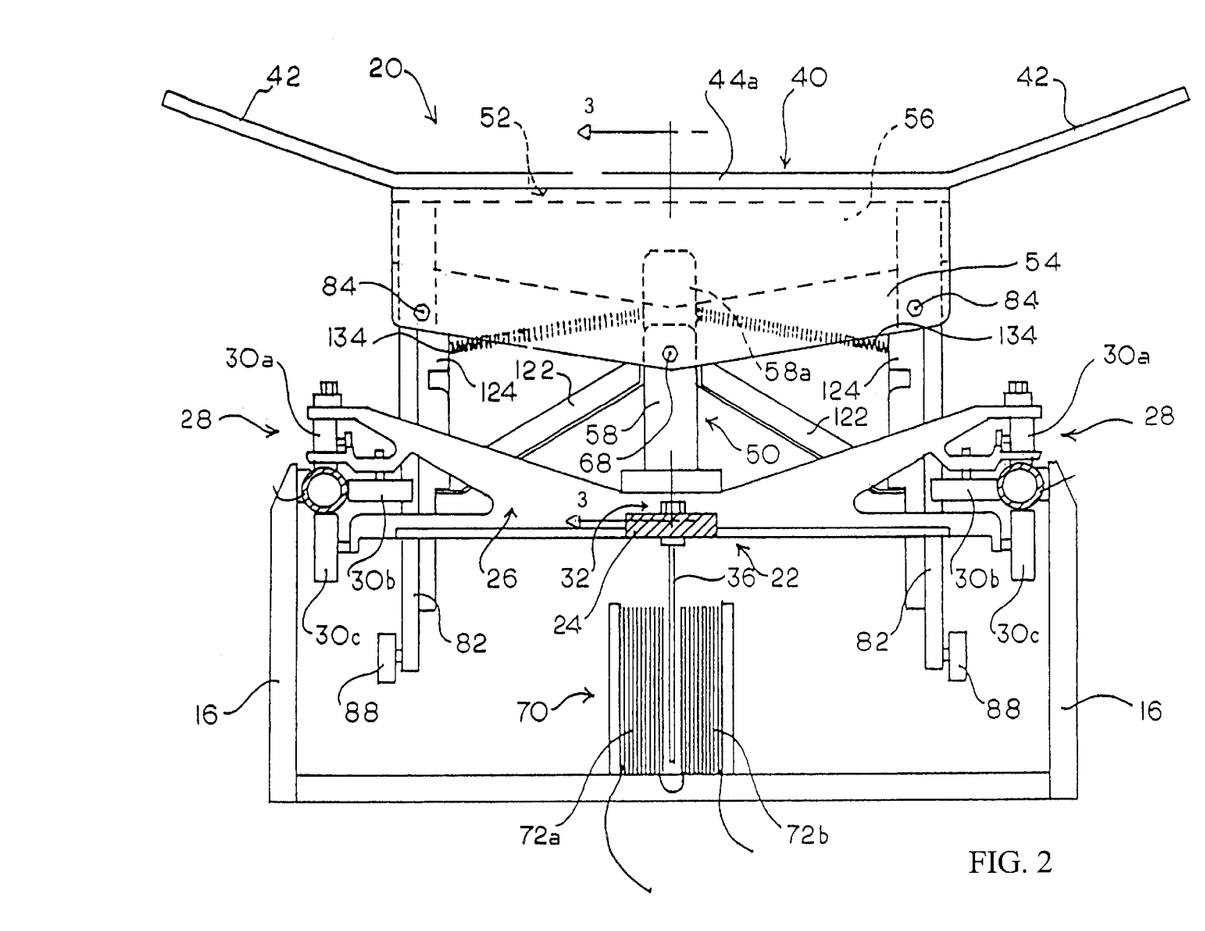
FIG. 2 is a front, elevation view of a single tilting conveyor cart of the package sorting conveyor and the power source of the conveyor.

As best shown in FIG. 2, each cart 20 includes three major sub-assemblies: a trailer frame structure 22, a generally horizontally disposed carrying tray 40 for holding the package 11 and a tiltable support apparatus 50.

Each cart 20 is built around a base trailer frame structure 22 to which other components of each cart 20 are mounted. Mounted atop the trailer frame structure 22 of each conveyor cart 20 is the tiltable support apparatus 50, which supports the carrying tray 40 thereabove. The tiltable support 50 supports the carrying tray 40 above the trailer frame structure 22 and allows tilting of the carrying tray 40 toward either side of the sorting conveyor 10 to unload a package into one of the unloading stations. Further details and operation of the two-axis tilt tray are set forth in the parent application, the entire disclosure of which is hereby incorporated by reference.

Figure 3:
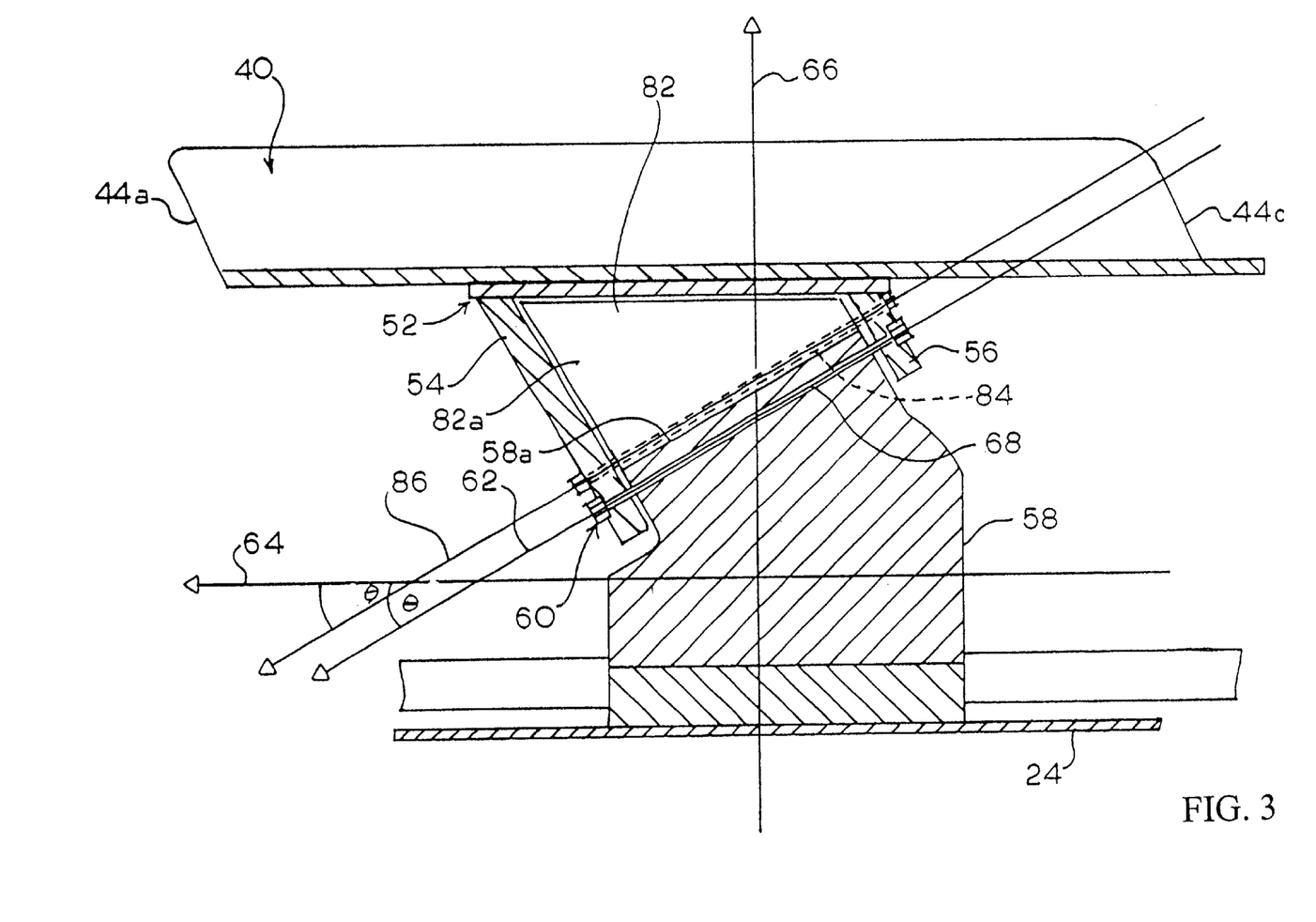
FIG. 3 is a sectional side view of a tilting conveyor cart, taken along lines 3—3 of FIG. 2, which shows the tiltable support apparatus and the angled pivot structure of the tilting conveyor cart.

As best seen in FIG. 3, the tiltable support apparatus 50 generally includes three components: an upper support structure 52 joined to a bottom surface of the carrying tray 40, a lower support structure 58 centrally mounted atop the longitudinal base member 24, and an angled pivot structure 60 pivotally connecting the lower support structure 58 to the upper support structure 52 along a pivot axis 62.

In turn, the upper support structure 52 includes a front support member 54 and a back support member 56. The lower support structure 58 is preferably, generally plainer, lying in the vertical plain parallel to the conveyor line of travel 64, and includes an angled upper edge 58A. The pivot structure 60 preferably includes an axle 68 that runs either through or along the upper edge 58A of the lower support structure 58 and is connected to the front and back support members 56, 58 respectively. Preferably, the axle runs through lower regions of the front and back support members 56, 58.

As can be seen, the front support member 54 depends further down from the carrying tray 40 then the back support member 56. While the lower support 58 is rigidly fixed to the trailer frame 22, the axle 68 allows the upper support structure 52 to pivot along the pivot axis 62 of the pivot structure 60.

In an alternate embodiment of the tiltable support apparatus [not shown], the upper support structure 52 could also include, similar to the lower support structure 58, a generally plainer member that lies in the vertical plain parallel to the conveyor line of travel 64. In this case, the angled pivot structure 60 could take on the form of a hinge structure joined together the two generally plainer support structures 52, 58.

The pivot axis 62 lies in a vertical plain parallel to the conveyor line of travel, which is shown in the drawings as horizontal line 64. However, unlike conventional sorter conveyor tilting carts, the pivot axis 62 of the conveyor cart 20 of the invention is disposed at an angle θ to the conveyor line of travel 64 so as to impart two axial components to the tilting of the carrying tray 40. Preferably, the pivot axis 62 angles downwardly at an angle of approximately 20–45 degrees below horizontal in a forward direction. In the embodiment disclosed, the pivot axis 62 is angled downwardly 30 degrees. The pivot axis 62 preferably intersects a plain occupied by the carrying tray 40 rearward of the center of the tray 40.

By disposing the pivot axis 62 in a downwardly directed angle θ instead of parallel to the conveyor line of travel 64, two axial components are imparted to the tilting motion of the carrying tray 40. The first axial component of the trays' tilting motion is lateral tipping on a horizontal axis parallel to the conveyor line of travel 64. The second axial component of the trays tilting motion is rotating around a vertical axis 66 perpendicular to the conveyor line of travel. Thus, while the tray only tilts along a single, angled pivot axis 62, the overall motion of the tray 40 as it tilts includes two axial components.

Figure 4A:
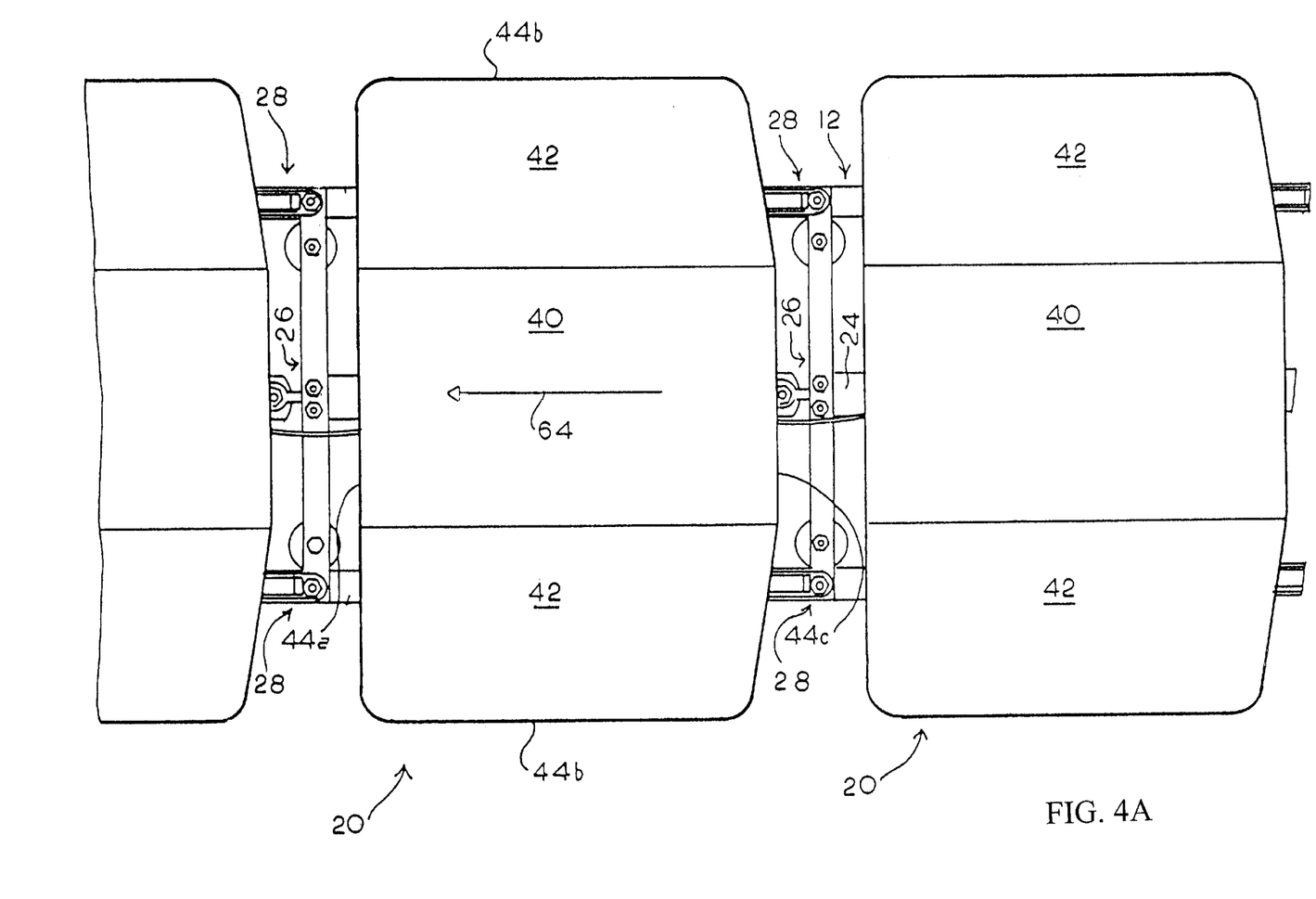
FIG. 4A is a top view of a train of carts of the package sorting conveyor.
Figure 4B:
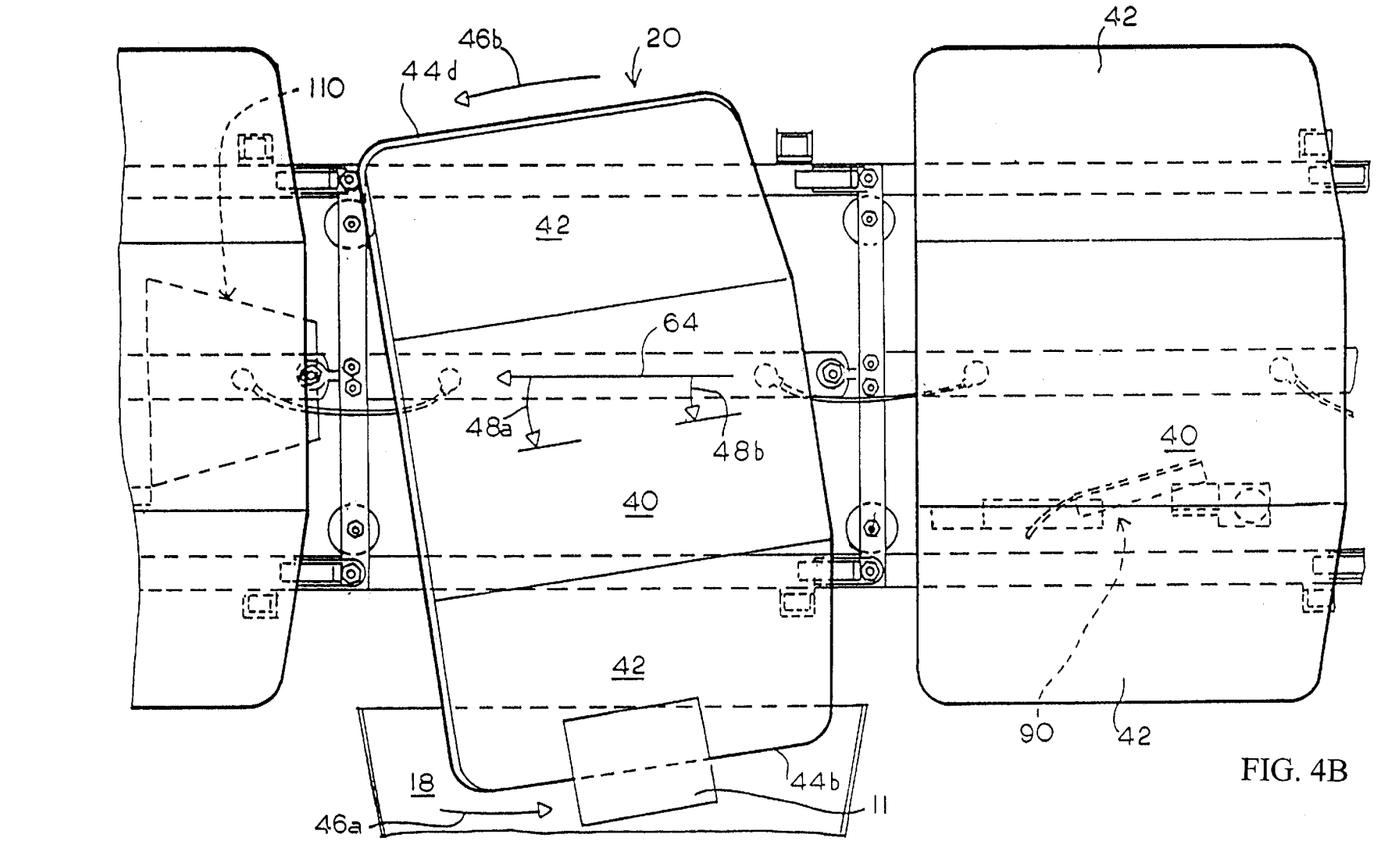
FIG. 4B shows the train of carts of FIG. 4A with one of the carts in its tilted position and unloading a package onto the transition zone funnel.

FIG. 4A shows a top view of a train of carts of the package sorting conveyor in their un-tilted position. One affect of the two-axis tilting of the carrying tray 40 is that a side 44b of the tray that is tilted downwardly also rotates rearwardly relative to the cart 20, as shown in FIG. 4B by line 46a. Side 44d of the tray, which is tilted upwardly, rotates forwardly relative to the cart 20, as shown by line 46b. In the preferred embodiment in which the pivot axis 62 intersects the plain occupied by the tray 40 rear of center, the front side 44a of the tray 40 rotates a greater distance around the vertical axis 66, then the backside 44c of the tray 40, upon tilting of the tray 40.

As also shown in FIG. 4B, the bisecting center line of the tray 40 rotates further at its forward end from the horizontal line of travel 64, then at its rearward end. Thus, front side rotation line 48a follows a longer arch than backside rotation line 48b. By rearwardly rotating whichever side of the tray 40 is being tilted downwardly, some rearward velocity is imparted to package 11 as they are being discharged from the cart 20 of the invention into the transition zone funnel 14. Thus, package 11 is discharged at a lower velocity relative to the transition zone funnel 14 than the velocity of the train of conveyor carts as a whole. This enables the package 11 to be discharged into a narrower "chute" than could be accomplished using a conventional conveyor cart. Additionally, because the package is slowed down somewhat as it is discharged, there is less potential for damage to occur.

Figure 5:
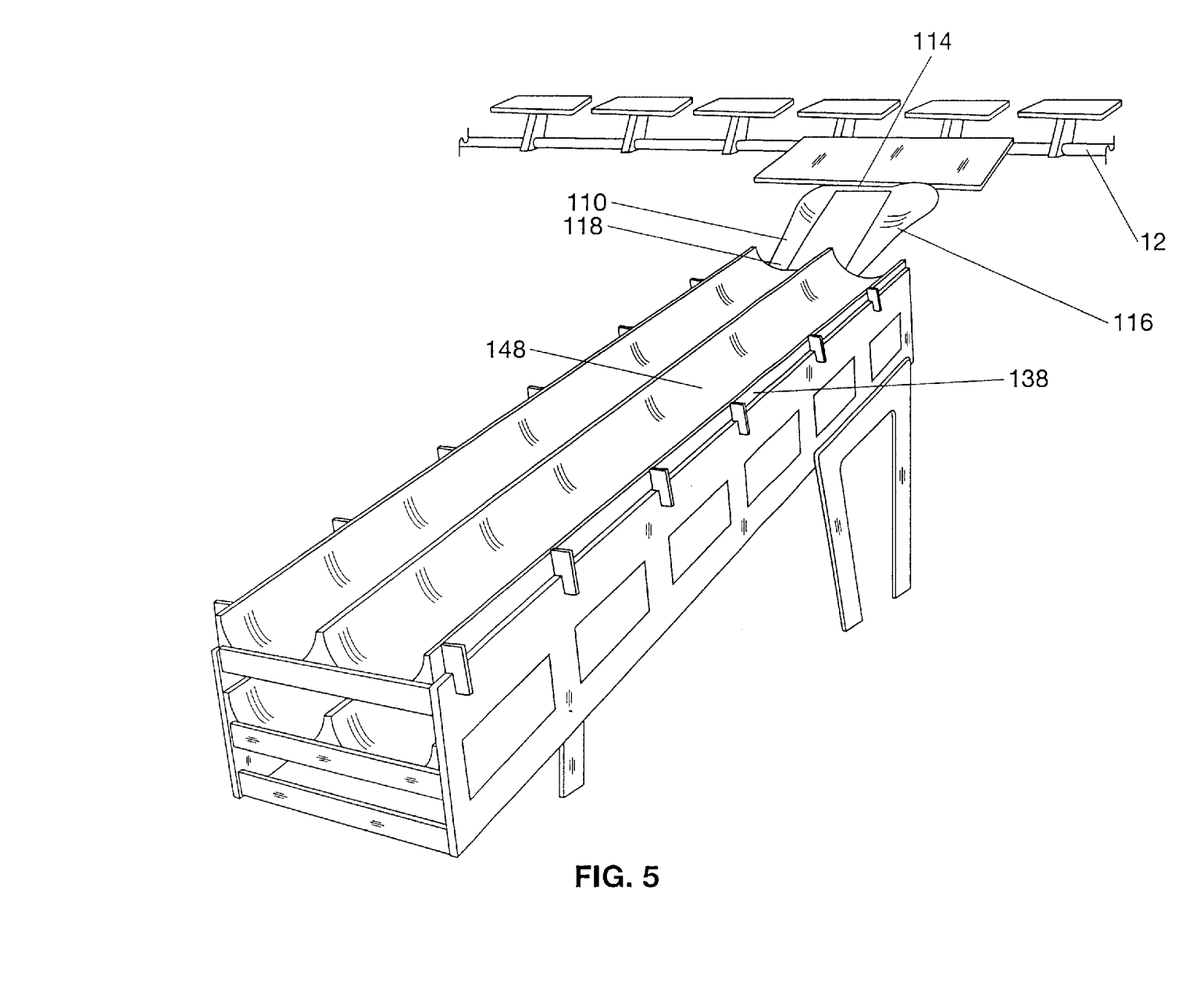
FIG. 5 is a perspective view from the bottom of the four secondary downstream chutes of the tilt tray conveyors and transition zone funnel, and secondary downstream chute shown in FIG. 1.

FIG. 5 is a perspective view from the bottom of four secondary downstream chutes 138 looking up at the conveyor track 12. At the top of the four secondary downstream chutes 138 is the transition zone funnel 110. The inlet 114 of the transition zone funnel 110 is the side of the funnel 110 closest to the conveyor track 12, where packages enter the funnel 110. The funnel 110 also includes an upwardly inclined downstream wall 116 for guiding packages into the funnel 110. Four secondary chutes, each having low-friction curved surface 148 are downstream from the transition zone funnel 110.

Figure 6:
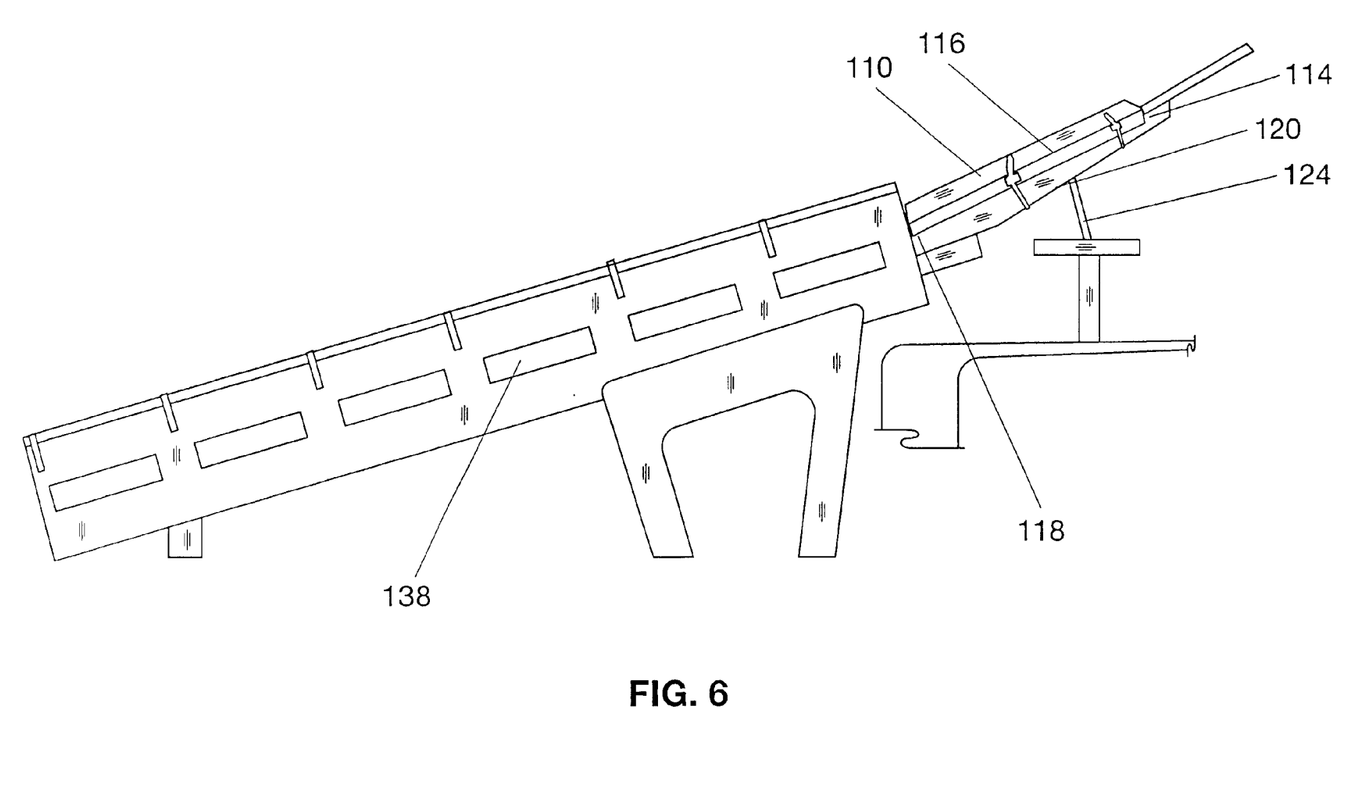
FIG. 6 is a side view of the transition zone funnel for the four secondary downstream chutes.

FIG. 6 is a side view of the transition zone funnel 110 and the four secondary downstream chutes 138. The positioner assembly 120 selectively moves the transition zone funnel outlet 118 into alignment with one of the four secondary downstream chutes 138.

Figure 7:
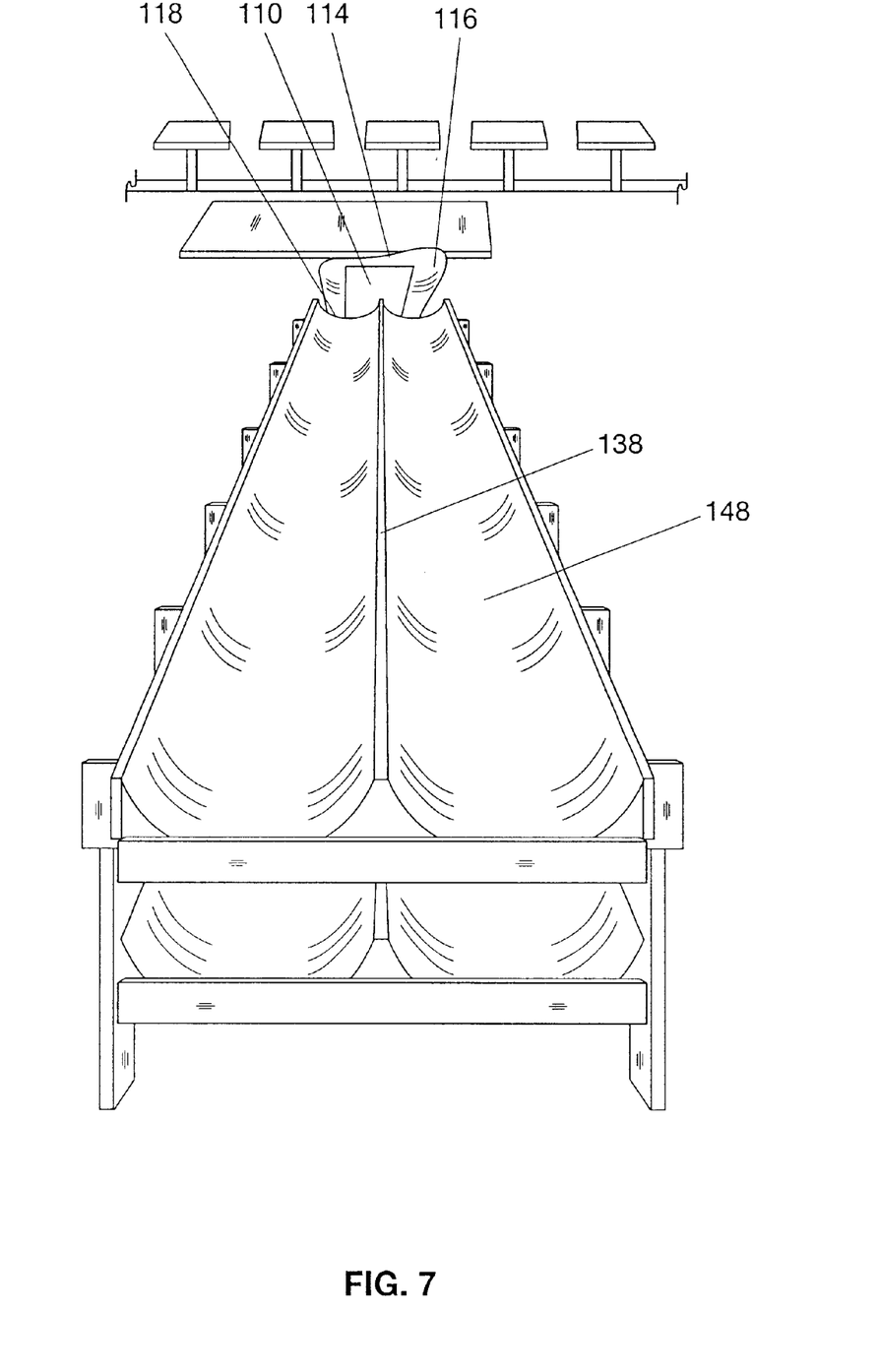
FIG. 7 is an end view of the bottom of the four secondary downstream chutes.

FIG. 7 is an end view of the bottom of the four secondary downstream chutes 128, each having a low-friction curved surface 148. A pair of chutes rests directly atop and runs along parallel to a pair underneath. At the top of FIG. 9 is the position zone funnel 11, including the inlet 114, outlet 118, and upwardly inclined downstream wall 116.

Figure 8:
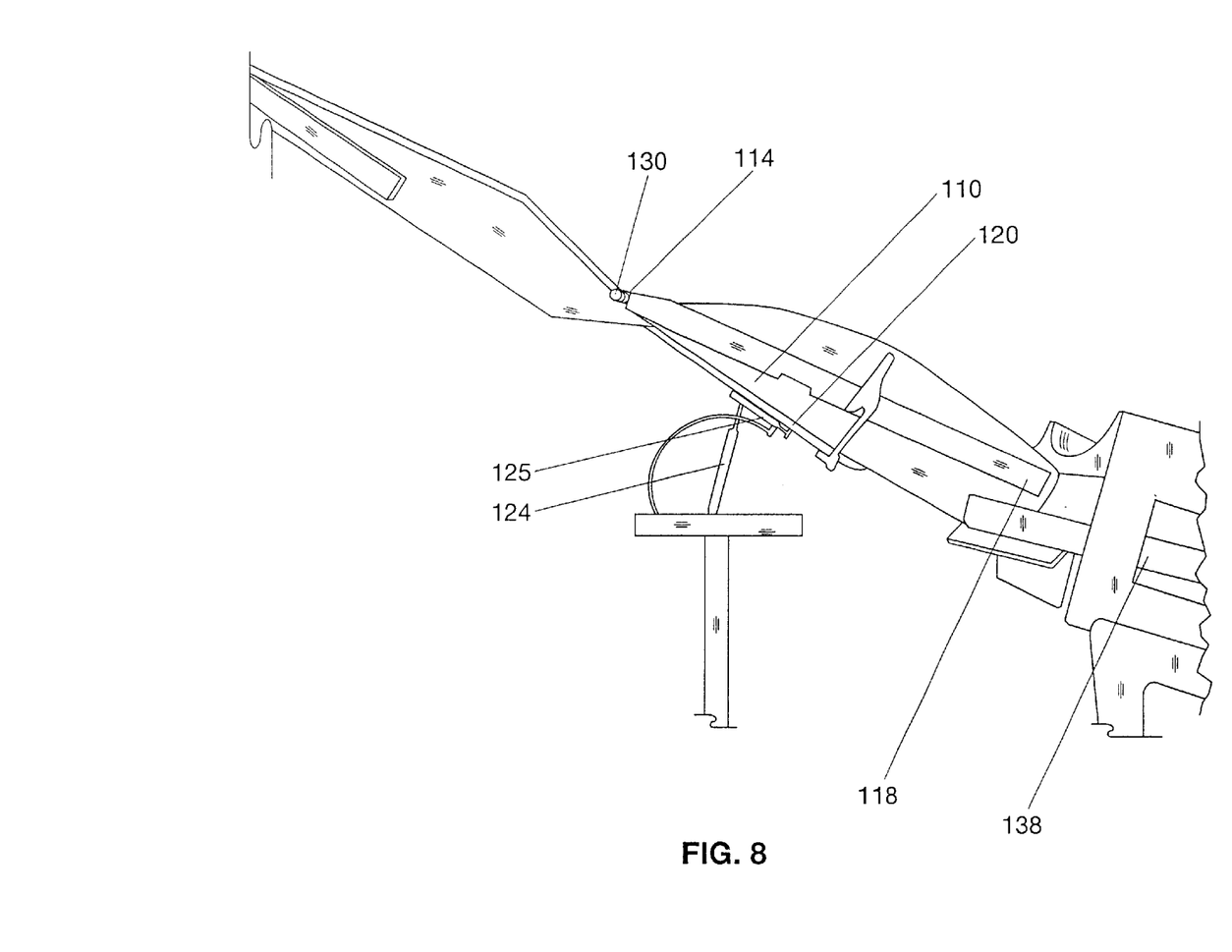
FIG. 8 is a side view of the transition zone funnel.

FIG. 8 is a side view of the transition zone funnel 110 including the positioner assembly 120, which includes a rotary joint 126 and horizontal drive means 125 for moving the transition zone funnel 110 about a vertical axis and a hinge joint 130 and vertical drive means 124 for moving the funnel 110 about a horizontal axis.

Figure 9:
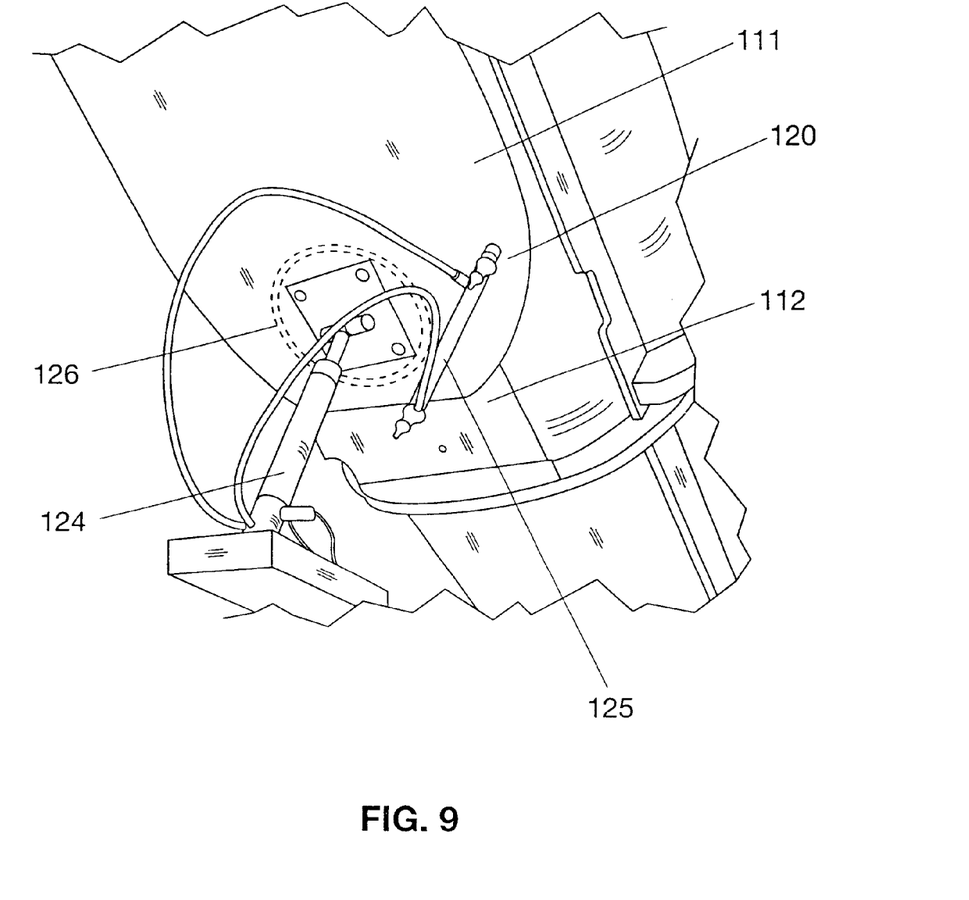
FIG. 9 is a bottom perspective view of the positioner assembly for the transition zone funnel.

FIG. 9 is bottom perspective view of the positioner assembly 120 including a lower plate 111 and an upper plate 112. Also shown is the horizontal drive means 125 and rotary joint 136 and a vertical drive means 124 for moving the transition zone funnel 110 about a horizontal axis.

Figure 10:
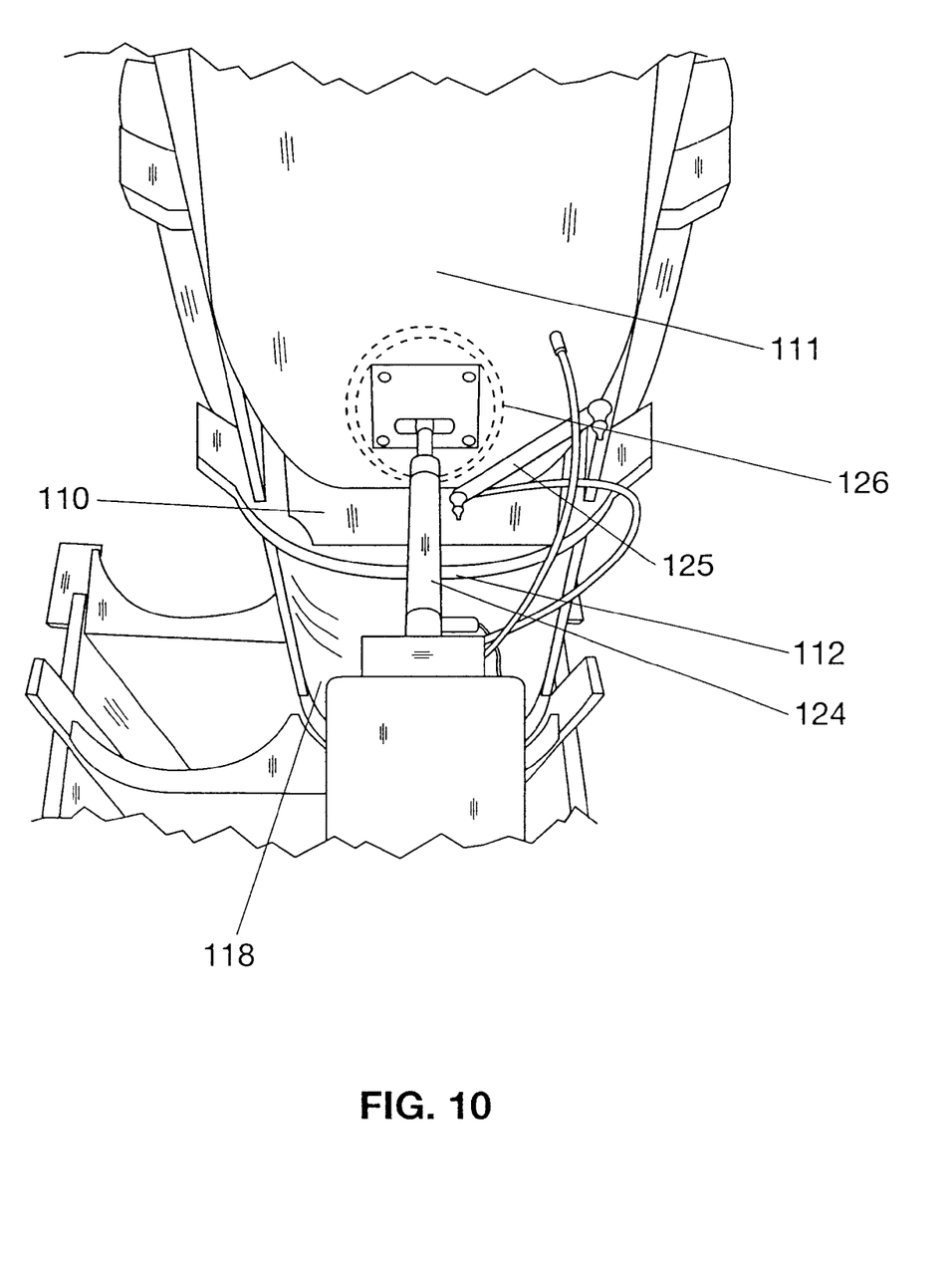
FIG. 10 is a bottom rear view of the positioner assembly for the transition zone funnel.

FIG. 10 is a rear bottom view of the positioner assembly 120 including the upper 112 and lower plate 111 of the transition zone funnel 110. A vertical drive means 124 for moving the transition zone funnel 110 about a horizontal axis, and a horizontal drive means 124 for moving the transition zone funnel 110 about a vertical axis is also shown.

Figure 11:
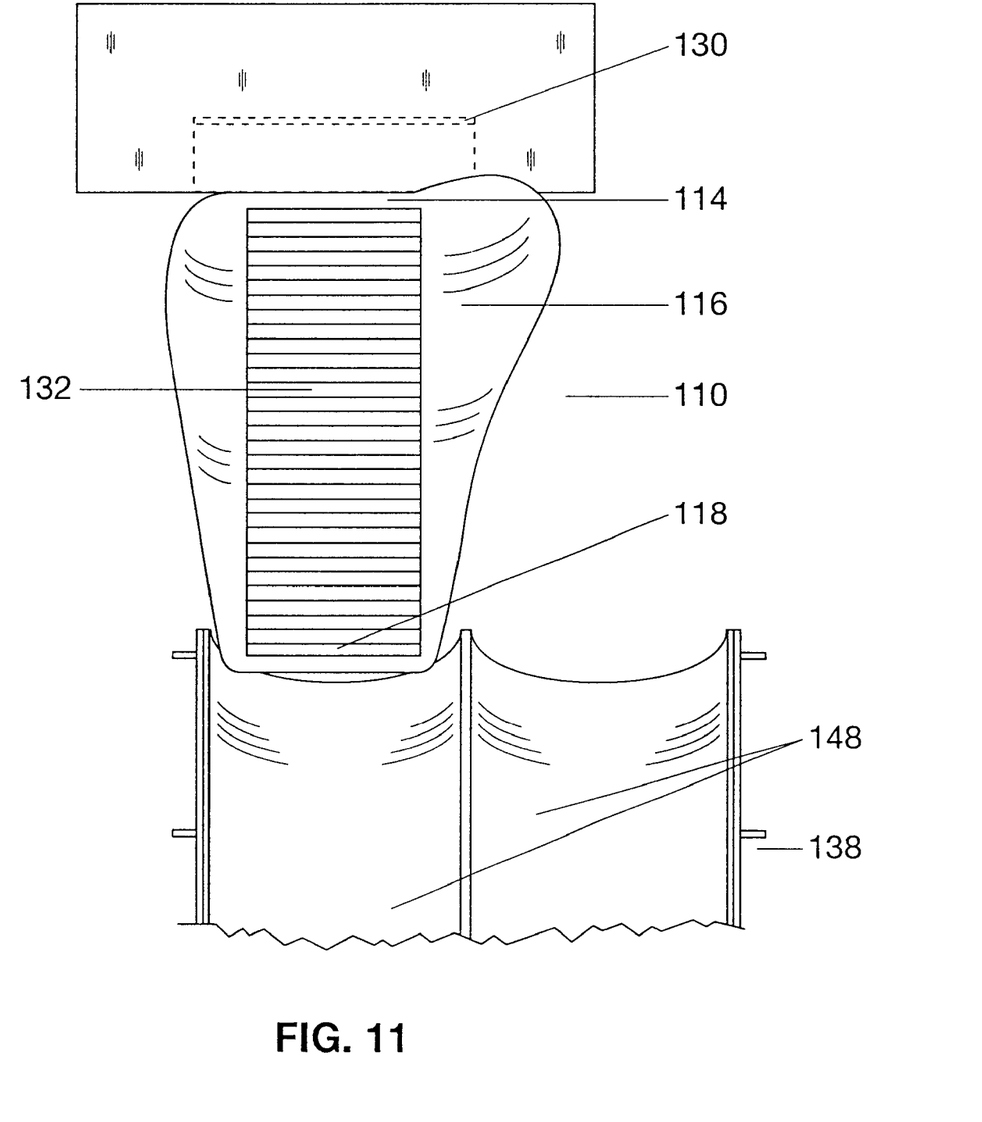
FIG. 11 is an enlarged top view of the transition zone funnel illustrating an alternative embodiment having a powered conveying surface.

FIG. 11 is an enlarged top view of the transition zone funnel 110 illustrating an alternative embodiment having a powered conveying surface 132 for moving a package from the funnel 110 inlet along the conveying surface 132 to the funnel outlet 118 and selectively discharging the package onto the low-friction curved surface 148 of one of the four secondary downstream chutes 138.

In operation, a package moves along the conveyor track 12 to an out-feed position where it is discharged into the inlet 114 of the transition zone funnel 110, with the upwardly inclined downstream wall 116 slowing the forward momentum of the package and guiding the package across the funnel 110 into the funnel outlet 118. When a box package moves across the funnel 110, the funnel 110 orients the package such that an end of the package is generally perpendicular to the conveyor track 12 when the box leaves the funnel outlet 118. In the preferred embodiment, gravity moves the package along the transition zone funnel 110 from the inlet 114 to the outlet 118 because the funnel inlet 114 is higher than the funnel outlet 118. Also, the transition zone funnel 110 includes a low-friction surface to reduce the coefficient of friction between the package and the funnel surface. In an alternative embodiment, the transition zone funnel includes a powered conveying surface 132 for moving a package across the transition zone funnel 110.

The positioner assembly 120 selectively moves the transition zone funnel 110 so that its outlet 118 is aligned with one of four output positions. The positioner assembly 120 includes a vertical drive means 124 and a hinge joint 130, pivotally connecting the transition zone funnel 110 to the conveyor track 12 along a lower plate 111 of the transition zone funnel. When the vertical drive means 124 is selectively activated, the drive means 124 exerts a force upon the bottom of the transition zone funnel 110 in an upward direction, rotating the funnel 110 from a lower to an upper position about the hinge joint 130 that connects the funnel lower plate 111 to the conveyor track 12. The funnel 110 moves by the force of gravity from the upper to lower position.

The transition zone funnel 110 also includes a rotary joint 126 for connecting the lower plate 111 of the transition zone funnel 110 to an upper plate 112 of the funnel 110. The upper plate 112 is rotated about the rotary joint 126 with a horizontal drive means 125, which selectively operates in opposite directions to move the upper plate 112 of the funnel 110 between a right and left position. In the preferred embodiment, the vertical drive means 124 and horizontal drive means 125 of the positioner assembly drive simultaneously, as required, to selectively move the funnel 110 between four output positions such that the funnel outlet 118 deposits a package into one of the four secondary downstream chutes.

The four secondary downstream chutes 138 are aligned at the end of the conveyor. One pair of chutes rests atop and parallel to another pair below. Each of the four secondary downstream chutes 138 has a low-friction curved surface 148. In the preferred embodiment, gravity moves packages along the chutes, which 138 decline about 15 degrees from the funnel outlet 110 to a position above a floor where an operator removes the packages from the chutes 138.

Certain modifications and improvements will occur to those skilled in the art upon a reading of the foregoing description. By way of example, the four secondary downstream chutes can be formed of several sections of flat sheet metal or other materials instead of being a continuously curved surface. It should be understood that all such modifications and improvements have been deleted herein for the sake of conciseness and readability but are properly within the scope of the following claims.

We claim:

1. A package sorting conveyor system comprising:
    (a) a conveying track;
    (b) at least one unloading station; and
    (c) a transition zone funnel upstream of said unloading station to receive said package, said transition zone funnel including a positioner assembly for selectively positioning the outlet of said transition zone funnel between at least a first and a second position along at least two non-parallel axes.

2. The apparatus according to claim 1, further including a secondary downstream chute located downstream from said transition zone funnel for conveying the discharged package to its final destination.

3. The apparatus according to claim 2, wherein said secondary chute further includes at least two definable discharge paths.

4. The apparatus according to claim 3, wherein said discharge path includes at least one path having a curved surface.

5. The apparatus according to claim 4, wherein said curved surface is between about 90° and 360°.

6. The apparatus according to claim 4, wherein said curved surface is between about 6 inches and 30 inches radius of curvature.

7. The apparatus according to claim 2, wherein the surface of said secondary downstream chute is a low friction, wear resistant polymeric material.

8. The apparatus according to claim 7, wherein said material is a high density polyethylene.

9. A transition zone funnel for receiving a package discharged at an unloading station by a package sorting conveyor system having a conveying track, said transition zone fennel comprising:
    (a) an inlet adjacent to said conveying track at said unloading station for receiving said package;
    (b) an upwardly inclined downstream wall located downstream of said inlet for preventing said package from tipping over;
    (c) an outlet located downstream from said upwardly inclined downstream wall for discharging said package from said funnel; and
    (d) a positioner assembly for selectively positioning said outlet of said transition zone funnel between at least a first and a second position along at least two non-parallel axes.

10. The apparatus according to claim 1, wherein said inlet is substantially flat to receive said package being discharged by said package sorting conveyor system.

11. The apparatus according to claim 1, wherein said inlet is wider than the front edge of said package providing a wider range of curvature enabling the package to slide off said package sorting conveyor system onto said inlet.

12. The apparatus according to claim 11, wherein said upwardly inclined downstream wall has a radius of curvature of between about 6 inches and 2½ feet.

13. The apparatus according to claim 12, wherein said upwardly inclined downstream wall has a radius of curvature of about 1 foot.

14. The apparatus according to claim 1, wherein the forward direction of said package changes about 90° from its initial direction on said conveying track to its direction at the outlet of said funnel.

15. The apparatus according to claim 1, wherein the surface of said transition zone funnel is a low-friction, wear-resistant polymeric material.

16. The apparatus according to claim 15, wherein said material is a high-density polyethylene.

17. The apparatus according to claim 1, wherein said positioner assembly for selectively positioning between at least a first and a second position along at least two axis further includes at least one pivot point and a drive means.

18. The apparatus according to claim 17, wherein said pivot point includes a ball joint.

19. The apparatus according to claim 17, wherein said pivot point includes an inclined axis.

20. The apparatus according to claim 17, wherein said pivot point includes at least two independent pivots.

21. The apparatus according to claim 20, wherein said two independent pivots include a rotary joint and a hinge joint.

22. The apparatus according to claim 17, wherein said drive means for positioning includes a rotary actuator.

23. The apparatus according to claim 17, wherein said drive means for positioning includes a linear actuator.

24. The apparatus according to claim 23, wherein said linear actuator is a fluid actuator.

25. The apparatus according to claim 1, wherein said transition zone funnel further includes a powered conveying section for accelerating or decelerating said package.

26. The apparatus according to claim 25, wherein said powered conveying section is a powered roller.

27. The apparatus according to claim 25, wherein said powered conveying section is a powered belt.

28. A package sorting conveyor system comprising:
  (a) a conveying track;
  (b) at least one unloading station;
  (c) a transition zone funnel upstream of said unloading station to receive said package from said conveying track, said transition zone funnel including: (i) an inlet adjacent to said conveying track at said unloading station for receiving said package; (ii) an upwardly inclined downstream wall located downstream of said inlet for preventing said package from tipping over; (iii) an outlet located downstream from said upwardly inclined downstream wall for discharging said package from said funnel; and (iv) a positioner assembly for selectively positioning said outlet of said transition zone funnel between at least a first and a second position along at least two non-parallel axes; and
  (d) a secondary downstream chute located downstream from said transition zone funnel for conveying the discharged package to its final destination.

29. The apparatus according to claim 28, wherein said secondary chute further includes at least two definable discharge paths.

30. The apparatus according to claim 29, wherein said discharge path includes at least one path having a curved surface.

31. The apparatus according to claim 30, wherein said curved surface is between about 90° and 360°.

32. The apparatus according to claim 30, wherein said curved surface is between about 6 inches and 30 inches radius of curvature.

33. The apparatus according to claim 28, wherein the surface of said secondary downstream chute is a low friction, wear resistant polymeric material.

34. The apparatus according to claim 33, wherein said material is a high density polyethylene.

35. The apparatus according to claim 28, wherein said inlet is substantially flat to receive said package being discharged by said package sorting conveyor system.

36. The apparatus according to claim 28, wherein said inlet is wider than the front edge of said package providing a wider range of curvature enabling the package to slide off said package sorting conveyor system onto said inlet.

37. The apparatus according to claim 36, wherein said upwardly inclined downstream wall has a radius of curvature of between about 6 inches and 2½ feet.

38. The apparatus according to claim 37, wherein said upwardly inclined downstream wall has a radius of curvature of about 1 foot.

39. The apparatus according to claim 28, wherein the forward direction of said package changes about 90° from its initial direction on said conveying track to its direction at the outlet of said funnel.

40. The apparatus according to claim 28, wherein the surface of said transition zone funnel is a low-friction, wear-resistant polymeric material.

41. The apparatus according to claim 40, wherein said material is a high-density polyethylene.

42. The apparatus according to claim 28, wherein said positioner assembly for selectively positioning between at least a first and a second position along at least two axis further includes at least one pivot point and a drive means.

43. The apparatus according to claim 42, wherein said pivot point includes a ball joint.

44. The apparatus according to claim 42, wherein said pivot point includes an inclined axis.

45. The apparatus according to claim 42, wherein said pivot point includes at least two independent pivots.

46. The apparatus according to claim 45, wherein said two independent pivots include a rotary joint and a hinge joint.

47. The apparatus according to claim 42, wherein said drive means for positioning includes a rotary actuator.

48. The apparatus according to claim 42, wherein said drive means for positioning includes a linear actuator.

49. The apparatus according to claim 48, wherein said linear actuator is a fluid actuator.

50. The apparatus according to claim 28, wherein said transition zone funnel further includes a powered conveying section for accelerating or decelerating said package.

51. The apparatus according to claim 50, wherein said powered conveying section is a powered roller.

52. The apparatus according to claim 50, wherein said powered conveying section is a powered belt.

* * * * *